US005837641A

United States Patent [19]
Gosling et al.

[11] Patent Number: 5,837,641
[45] Date of Patent: Nov. 17, 1998

[54] METHOD OF PROMOTING THE ACTIVITY OF SOLID STRONG ACID CATALYSTS

[75] Inventors: Christopher D. Gosling, Roselle; Paul G. Blommel, Bolingbrook; Michelle J. Cohn, Mount Prospect; Ralph D. Gillespie, Gurnee; Jennifer S. Holmgren, Bloomingdale, all of Ill.

[73] Assignee: UOP LLC, Des Plaines, Ill.

[21] Appl. No.: 585,986

[22] Filed: Jan. 16, 1996

[51] Int. Cl.⁶ .......................... B01J 27/047; B01J 23/00; B01J 23/14

[52] U.S. Cl. .......................... 502/219; 502/220; 502/222; 502/305; 502/308; 502/311; 502/313; 502/322; 502/325; 502/327; 502/513; 502/514

[58] Field of Search ............................ 502/219, 221, 502/220, 222, 223, 300, 305, 308, 311, 313, 322, 325, 326, 327, 513, 514

[56] References Cited

U.S. PATENT DOCUMENTS

| | | | |
|---|---|---|---|
| 3,032,599 | 5/1962 | Holm et al. | 260/683.64 |
| 3,132,110 | 5/1964 | Hansford | 252/440 |
| 3,252,757 | 5/1966 | Granquist | 23/111 |
| 3,535,228 | 10/1970 | Csicsery et al. | 208/59 |
| 3,625,865 | 12/1971 | Kittrell et al. | 502/514 |
| 4,406,821 | 9/1983 | Farcasiu | 252/440 |
| 4,918,041 | 4/1990 | Hollstein et al. | 502/217 |
| 4,956,519 | 9/1990 | Hollstein et al. | 585/751 |
| 5,036,035 | 7/1991 | Baba et al. | 502/221 |
| 5,113,034 | 5/1992 | Soled et al. | 585/510 |
| 5,120,898 | 6/1992 | Baba et al. | 585/750 |
| 5,157,199 | 10/1992 | Soled et al. | 585/750 |

(List continued on next page.)

FOREIGN PATENT DOCUMENTS

0520543 A1  12/1992  European Pat. Off. ....... B01J 27/053

OTHER PUBLICATIONS

Mastikhin, V.M.; Nosov, A.V.; Filimonova, S.V.; Terskik, V.V.; Kotsarenko, N.S.; Shmachkova, V.P.; Kim, V.I. *Journal of Molecular Catalysis*, 101 (1995) 81–90. Mar. 1995.

Babou, F.; Bigot, B.; Sautet, P. *J. Phys. Chem.* 97, 11501–11509 (1993). Jul. 1993.

Morterra, C.; Cerrato, G.; Pinna, F.; Signoretto, M.; Strukul, G. *Journal of Catalysis*, 149, 181–188 (1994). Mar. 1994.

Wen, M.Y.; Wender, I.; Tierney, J.W., *Energy & Fuels* 4, 372–379 (1990). Feb. 1990/Apr. 1990.

Mukida, K,; Moyoshi, T.; Takashi, S. "Effects of Sulfuric Acid Concentration in Preparation of Solid Super Acid Catalyst $SO_4^{2-}/ZrO_2$ on Physical Structure, Acid Property and Catalyst Activity"; Report of Department of Chemical Engineering, Faculty of Engineering, Muroran Institute of Technology; Muroran, Japan, 1989. Month not available.

Arata, K.; Hino, M. *Materials Chemistry and Physics*, 26, 213–237. Month not avail.

(List continued on next page.)

*Primary Examiner*—Glenn Caldarola
*Assistant Examiner*—Patricia L. Hailey
*Attorney, Agent, or Firm*—Thomas K. McBride; Eugene I. Snyder; Maryann Maas

[57] ABSTRACT

A method of continuously promoting the activity of solid strong acid catalysts used in acid catalyzed reactions by adding or generating water in the reaction mixture has been developed. The solid strong acid catalyst may be a sulfated metal oxide, a tungstated metal oxide, or a molybdated metal oxide. The metal oxides are oxides, hydroxides, oxyhydroxides, or oxide-hydrates of Group IV-A, Group III-A, Group III-B, and Group V-A metals. The catalyst may also contain a Group VIII metal, or when the metal oxide is a hydroxide, oxide, oxyhydroxide, or oxide-hydrate of the Group IV-A, Group III-A, or Group III-B metals, the catalyst may also contain an oxide, hydroxide, oxyhydroxide or oxide-hydrate of a Group V-A, Group V-B, Group VI-B, or Group VII-B metal as a promoter. The acid catalyzed reactions where the activity promotion method may be applied include catalytic cracking, catalytic reforming, hydrodesulfurization, isomerization, alkylation of aliphatic and aromatic hydrocarbons, polymerization, and oligomerization. The amount of water added to or generated in the reaction mixture may be from about 0.1 ppm to about 500 ppm water.

13 Claims, 4 Drawing Sheets

U.S. PATENT DOCUMENTS

| | | | |
|---|---|---|---|
| 5,182,247 | 1/1993 | Kuhlmann et al. | 502/217 |
| 5,345,028 | 9/1994 | Alerasool | 585/750 |
| 5,362,694 | 11/1994 | Hollstein et al. | 585/750 |
| 5,393,724 | 2/1995 | Okajima et al. | 502/514 |
| 5,516,964 | 5/1996 | Umansky et al. | 585/750 |

OTHER PUBLICATIONS

Bodamer, V. B. *Erdoel, Erdgas, and Kohle*, Dec. 1989, 105(12), 513–516, Dec. 1989.

A. F. Wells, *Structural Inorganic Chemistry*, 5th Ed., Clardon Press: Oxford, pp. 531–535, Oct. 1984.

METHOD OF PROMOTING THE ACTIVITY OF SOLID STRONG ACID CATALYSTS

BACKGROUND OF THE INVENTION

Solid strong acid catalysts are increasingly being chosen as the preferred catalyst for use in acid catalyzed processes. These catalysts are well known in the art as demonstrated in U.S. Pat. No. 3,032,599, U.S. Pat. No. 3,132,110, and EP 0 520 543 A1. The use of these catalysts in acid catalyzed processes are also well known in the art as shown in U.S. Pat. No. 5,182,247, U.S. Pat. No. 5,120,898, and U.S. Pat. No. 4,918,041. How these catalysts work, however, is not as well understood and there is much debate about the exact mechanism. For example, the article Mastikhin, V. M.; Nosov, A. V.; Filimonova, S. V.; Terskik, V. V.; Kotsarenko, N. S.; Shmachkova, V. P.; Kim, V. I. *Journal of Molecular Catalysis*, 1995, 101, 81–90 stands for the proposition that the Lewis acid sites on the surface of the catalyst are responsible for the catalysis function while the article Babou, F.; Bigot, B.; Sautet, P. *J. Phys. Chem.* 1193, 97, 11501–11509 claims the Brönsted sites on the surface of the catalyst provide the acidity for catalysis.

As solid strong acid catalysts gain popularity, ways to enhance their activity are being explored. Adamantane has been used to promote the activity of solid strong acid catalysts, see: U.S. Pat. No. 5,157,199. But a controversy exists over whether water acts to poison or enhance the catalyst. An article by Wen, M. Y.; Wender, I.; Tierney, J. W. *Energy & Fuels* 1990, 4, 372–379 discloses that in a hydrocracking process conducted in a nonstirred batch minireactor at 110° C. with a sulfated bimetal oxide catalyst, the conversion of n-heptane was greater when the n-heptane was saturated with moisture than when the n-heptane was anhydrous. On the other hand, an article by Morterra, C.; Cerrato, G.; Pinna, F.; Signoretto, M.; Strukul, G. *Journal of Catalysis* 1994, 149, 181–188 discloses that in an isomerization process using a continuous flow reactor with a sulfated zirconia catalyst, the addition of even a very small amount of water to the reaction mixture appreciably reduces the conversion of n-butane.

Applicants have demonstrated that water promotes solid strong acid catalyst activity in a continuous fixed bed isomerization operation. Applicants have determined the range of water concentrations that are effective as catalyst promoters in this reaction, and have noted the importance of coordinating the water concentration with the temperature of the process.

SUMMARY OF THE INVENTION

The purpose of the invention is to provide a method of promoting the activity of solid strong acid catalysts used in acid catalyzed reactions through adding or generating an effective level of water in the reaction mixture. The solid strong acid catalyst may be a sulfated metal oxide, a tungstated metal oxide, or a molybdated metal oxide. The metal oxides are oxides, hydroxides, oxyhydroxides or oxide-hydrates of iron, or the Group IV-A, Group III-A, Group III-B, or Group V-A metals. The catalyst may also contain a Group VIII metal supported on the surface. When the metal oxide is an oxide, hydroxide, oxyhydroxide or oxide-hydrate of a the Group IV-A, Group III-A, or Group III-B metal, the catalyst may further contain an oxide, hydroxide, oxyhydroxide or oxide-hydrate of a Group V-A, Group V-B, Group VI-B, or Group VII-B metal. The acid catalyzed reactions where the invention may be applied include catalytic cracking, catalytic reforming, hydrodesulfurization, isomerization, alkylation of aliphatic and aromatic hydrocarbons, polymerization, and oligomerization. The amount of water added to or generated in the reaction mixture may be from about 0.1 ppm to about 500 ppm water.

An embodiment of the invention is one where the acid catalyzed reaction is the isomerization of linear alkanes containing from 4 to 8 carbon atoms to form branched alkanes. When the catalyst used in this embodiment is sulfated zirconia or sulfated zirconia with platinum dispersed thereon, the amount of water added to or generated in the reaction mixture may be from about 1 ppm to about 50 ppm with a preferred range of about 5 ppm to about 25 ppm water, and the temperature of the reaction is 180° C. or greater.

DETAILED DESCRIPTION OF THE INVENTION

Figure 1:
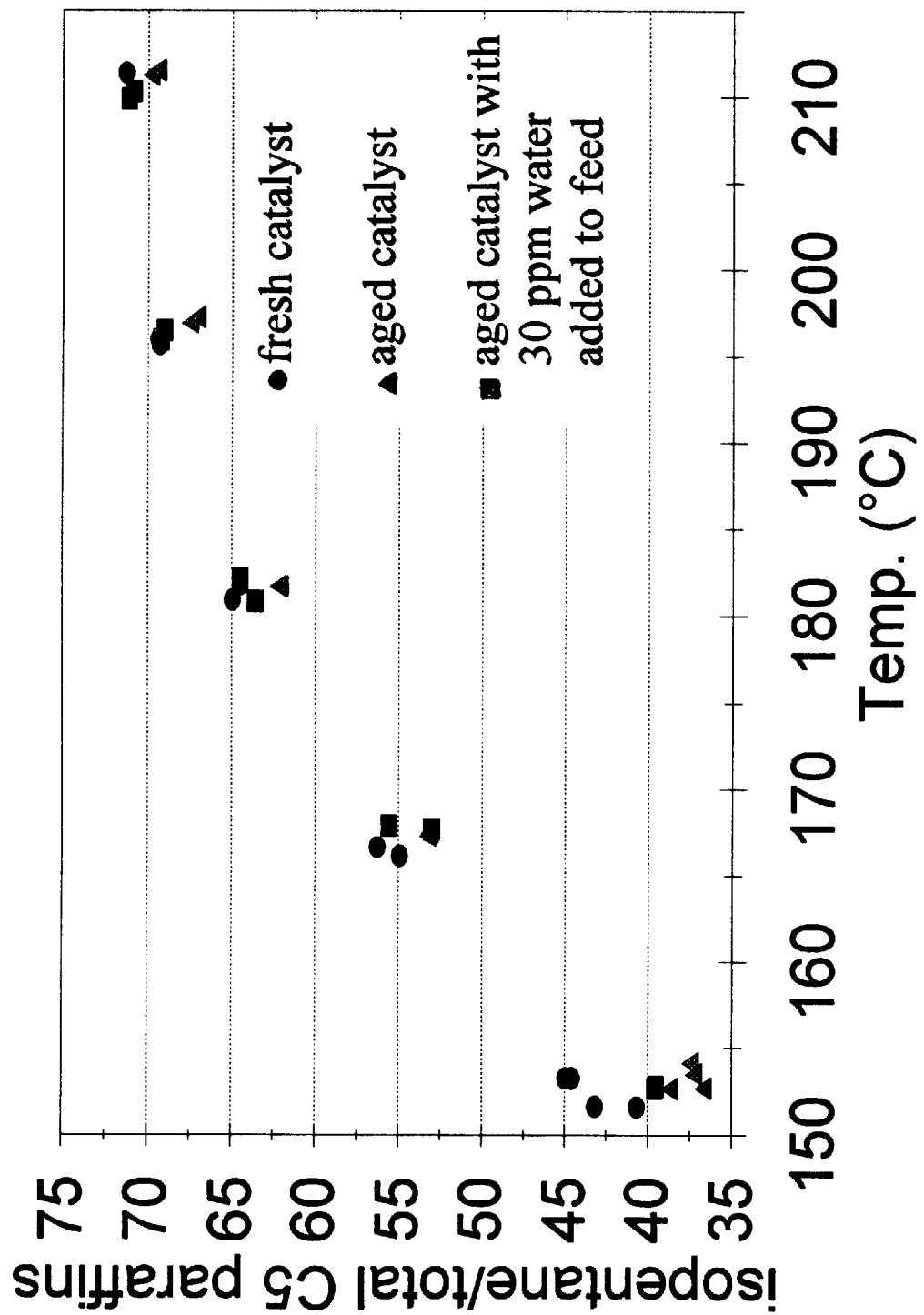
FIG. 1 and FIG. 2 are plots of the isomerization of $C_5$ and $C_6$ hydrocarbons, respectively, with continuous temperature adjustment, using 1) fresh catalyst, 2) aged catalyst, and 3) aged catalyst with water added to the isomerization reaction mixture.

The invention involves the promotion of solid strong acid catalysts used in acid catalyzed reactions by employing a reaction mixture that contains water. The specific catalysts of interest are sulfated, tungstated, or molybdated metal oxides. The metal oxide support portion of the catalyst is at least one hydroxide, oxide, oxyhydroxide, or oxide-hydrate of iron, or the Group IV-A, Group III-A, Group III-B, or Group V-A metals, including titanium, zirconium, silicon, germanium, tin, aluminum, gallium, indium, lead, and thallium. The preferred form of the support portion depends upon the element chosen. For example, when using zirconia the hydroxide is preferred, and when using alumina the oxide is preferred. The catalyst may further contain a Group VIII metal including nickel, platinum, ruthenium, rhodium, palladium, osmium, iridium, and iron dispersed on the metal oxide support as a catalyst promoter. Similarly, in addition to a Group VIII metal, when the metal oxide is a hydroxide, oxide, oxyhydroxide, or oxide-hydrate of the Group IV-A, Group III-A, or Group III-B metals, the catalyst may also contain an oxide, hydroxide, oxyhydroxide or oxide-hydrate of a Group V-A, Group V-B, Group VI-B, or Group VII-B metal including arsenic, antimony, bismuth, vanadium, niobium, tantalum, selenium, tellurium, chromium, molybdenum, tungsten, manganese, and rhenium as a catalyst promoter, see U.S. Pat. No. 4,918,041 and U.S. Pat. No. 4,956,519. Generally, the most preferred and most commonly used catalysts include sulfated zirconia and tungstated zirconia. The most preferred Group VIII promoter is platinum. These catalysts are well known in the art as shown in U.S. Pat. No. 4,406,821, U.S. Pat. No. 5,036,035, U.S. Pat. No. 5,120,898, Mukida, K.; Miyoshi, T.; Takashi, S. "Effects of Sulfuric Acid Concentration in Preparation of Solid Super Acid Catalyst $SO_4^{2-}/ZrO_2$ on Physical Structure, Acid Property and Catalyst Activity"; Report of Department of Chemical Engineering, Faculty of Engineering, Muroran Institute of Technology; Muroran:

Japan, 1989, and Arata, K.; Hino, M. *Materials Chemistry and Physics* 1990, 26, 213–237, and these catalysts may be prepared using any suitable known technique. For convenience, these catalysts will be termed herein as "solid strong acid catalysts".

These solid strong acid catalysts may be used to catalyze any acid catalyzed reaction such as catalytic cracking, catalytic reforming, hydrodesulfurization, isomerization, alkylation of aliphatic and aromatic hydrocarbons, polymerization, and oligomerization. Catalytic cracking involves converting gas oils, heavy naphtha, deasphalted crude oil residue into gasoline at temperatures from about 450° C. to about 600° C. and pressures from about 0 to about 5 psig. Catalytic reforming involves producing aromatics from naphthenes and paraffins at temperatures from about 400° C. to about 540° C. and pressures from about 50 to about 500 psig. Hydrodesulfurization involves hydrotreating middle distillates to remove sulfur at temperatures ranging from about 280° C. to about 450° C. and pressures from about 400 to about 800 psig. Isomerization may be of olefins at about 260° C. to about 480° C. and at about 50 to about 250 psig; or of paraffins, naphthenes and alkyl aromatics at about 100° C. to about 500° C. and at about 250 to about 500 psig. Alkylation of aliphatic hydrocarbons involves reacting light olefins with isoalkanes to produce paraffinic fuel at temperatures from about 0° C. to about 80° C. and pressures of about 100 to about 400 psig. Alkylation of aromatic hydrocarbons involves reacting an aromatic hydrocarbon with an olefin such as reacting benzene with ethylene to form ethylbenzene and reacting benzene with propylene to form cumene. Typical conditions include temperatures ranging from about 50° C. to about 300° C. and pressures of about 200 to about 1000 psig. Polymerization and oligomerization both involve reacting short chain olefins to form long chain olefins such as reacting propylene to form hexene and nonene. Typical conditions include temperatures ranging from about 150° C. to about 260° C. and pressures of about 400 to about 600 psig. It is preferred that the reactions be carried out in a continuous process operation using a fixed bed of catalyst. A particularly important reaction is the isomerization of normal alkanes containing from 4 to 8 carbon atoms to their branched and multi-branched isomers.

As discussed briefly earlier, a controversy exists in the art as to what portion of the solid strong acid catalyst actually provides the catalytic function. It has been proposed that the Lewis acid sites of the catalysts actually catalyze the reactions, see: Mastikhin, V. M.; Nosov, A. V.; Filimonova, S. V.; Terskik, V. V.; Kotsarenko, N. S.; Shmachkova, V. P.; Kim, V. I. *Journal of Molecular Catalysis*, 101 (1995) 81-90. However, others have proposed that the Brönsted acid sites and not the Lewis acid sites are responsible for the catalysis; see U.S. Pat. No. 5,182, 247. It is our belief, and the data disclosed herein supports the theory that the Brönsted acid sites are responsible for the catalysis. Therefore, the activity of the catalyst is directly related to amount of Brönsted acid sites present on the surface of the catalyst.

To achieve the highest level of activity possible in a solid strong acid catalyst, the amount of Brönsted sites on the catalyst should be maximized. Commonly known catalyst finishing techniques result in a particular amount of Brönsted acid sites present on a fresh catalyst. However, this amount may be limited since the extreme finishing conditions favoring the generation of Brönsted acid sites may cause other detrimental effects to the catalyst, and must therefore be restricted. Also, upon use in a process it is expected that the number of Brönsted acid sites on the catalyst would decrease with time due to the hydrocarbon process streams stripping water off the catalyst surface and converting the Brönsted acid sites to Lewis acid sites. As the amount of Brönsted acid sites on the catalyst decreases, the activity of the catalyst will also decrease.

The present invention promotes the activity of the catalyst by continually creating Brönsted acid sites in situ during the operation of the process through either adding water to the reaction mixture, or not drying or only partially drying a "wet" reaction mixture. An oxygenate such as alcohol, ether, ketone, or phenol may be added instead of water; this variant will be discussed in detail below. The invention may also be viewed as an improved process for carrying out acid catalyzed reactions where the improvement is using a reaction mixture containing an effective amount of water or oxygenate. When the proper amount of water or oxygenate at the proper process conditions is present in the reaction mixture, Lewis acid sites are converted to Brönsted acid sites and the activity of the catalyst is increased. Even with the water or oxygenate promotion, the catalyst performance will still degrade over time due to other factors, but with the relative degree of increased activity, the lifetime of the catalyst may be extended. For example, the temperature of a process containing a fresh catalyst is typically initially set to provide a required minimum level of a product specification. As the catalyst degrades, the temperature of the process is increased in order to maintain the minimum level of the product specification. Eventually, the maximum allowable temperature of the process will be reached and the minimum level of the product specification cannot be economically maintained. At this point, the deactivated catalyst will need to be regenerated. With the present invention, the boost in activity allows the initial temperature to be set lower than when dry feed is used while achieving the same required minimum level of a product specification. Since the maximum allowable temperature remains the same, the available temperature ramp is longer and the life of the catalyst is extended.

The amount of water or oxygenate present in the reaction mixture is dependent upon the reaction being catalyzed, the catalyst composition used, and the operating conditions of the process. A working range of water concentrations that may be added to or generated in the reaction mixture includes from about 0.1 ppm to about 500 ppm water, with the optimum water level being that amount necessary to maintain a high level of active Brönsted sites at reaction conditions. The operating temperature of the process should be balanced with the amount of water present. For example, if the operating temperature of a process is low, less than 150° C., low concentrations of water are preferable, such as less than 5 ppm water. If the operating conditions are sufficiently high, greater than 180° C., higher concentrations of water are suitable, such as greater than 10 ppm. Balancing the water concentration with the operating temperature of the process ensures that excess water that would attenuate the acidity of the catalyst, and therefore the activity, is not present.

A water precursor, or oxygenate, such as alcohol, ether, aldehyde, phenol, or some ketones may be added to the reaction mixture instead of water because at reaction conditions and in the presence of an acidic catalyst the oxygenate will undergo dehydration or other reactions to form water. Alcohols, ethers, and phenols readily undergo dehydration to form water, and aldehydes and ketones may undergo other reactions such as aldol condensation or various other decomposition reactions to ultimately form water. Any oxygenate that will undergo sufficient dehydration or degradation at the reaction conditions would be suitable for use in the invention. Enough oxygenate should be added so that the product water formed in the reaction mixture is in the desired concentration range as discussed above. The water product of the dehydration or other reaction may immediately react to form Brönsted sites on the catalyst and therefore may not be measurable in the reaction mixture. Given the operating conditions of the process and the exact identity of the catalyst and oxygenate, one skilled in the art would be able to readily determine how much oxygenate to add to generate a particular amount of water. Examples of suitable alcohols and ethers include those containing from about 1 to about 8 carbon atoms, depending upon the reaction temperature. Particularly preferred alcohols are butyl alcohol or tertiary butyl alcohol. The reaction temperature should be about 80° C. for the dehydration to occur. This approach of adding an oxygenate instead of water to the reaction mixture is commercially preferred, since the oxygenate is apt to be more miscible with a hydrocarbon feedstock than water would be. Also, since the oxygenate will have a greater molecular weight than water, it may be easier to physically add the correct amount of the oxygenate to the reaction mixture than it would be to add the correct amount of water.

To better illustrate the invention, the following description will detail the invention as used in an alkane isomerization process. A typical historical alkane isomerization process involves a dried $C_5$ and $C_6$ linear alkane feed being introduced along with hydrogen to a reactor containing an effective amount of sulfated zirconia catalyst and operating at an initial temperature of 190° C. The feed is partially isomerized to form branched alkanes and the reactor effluent is separated to afford a hydrogen stream which is recycled to the reactor and a hydrocarbon stream that is passed to a stabilizer. In the stabilizer, undesired cracked hydrocarbons containing four or less carbon atoms are separated from the $C_5$ and $C_6$ hydrocarbons. The stream containing the $C_5$ and $C_6$ hydrocarbons contains both linear and branched hydrocarbons and is collected as product.

The present invention would be applied in an alkane isomerization of this type by continuously introducing an amount of water into the $C_5$ and $C_6$ linear alkane feed. The water may be introduced using any commonly known technique. The amount of water that may be introduced varies from about 1 ppm water to about 50 ppm water with the most preferred range being from 5 ppm water to about 25 ppm water. Typically, the $C_5$ and $C_6$ linear alkane feed contains between 5 and 30 ppm water which has previously been removed by drying or distillation prior to being introduced into the isomerization reactor. With the present invention however, the feed could be introduced to the isomerization reactor without being dried, thereby saving the capital costs associated with the drying operation and still provide the requisite amount of water for the promotion of catalyst activity. The water would operate on the sulfated zirconia strong solid acid catalyst to continuously convert Lewis acid sites to Brönsted acid sites in situ thereby promoting the activity of the catalyst. This same approach could also be applied where the feed additionally contains linear alkanes having from about 4 to about 8 carbon atoms. Because the water increases the activity of the sulfated zirconia, the initial starting temperature of the reaction could be reduced to about 180° C. The initial reaction temperature may be different with different solid strong acid catalysts, but the trend remains the same, i.e., the initial reaction temperature is lower when maintaining water in the reaction mixture than when using an anhydrous reaction mixture.

EXAMPLE 1

Figure 2:
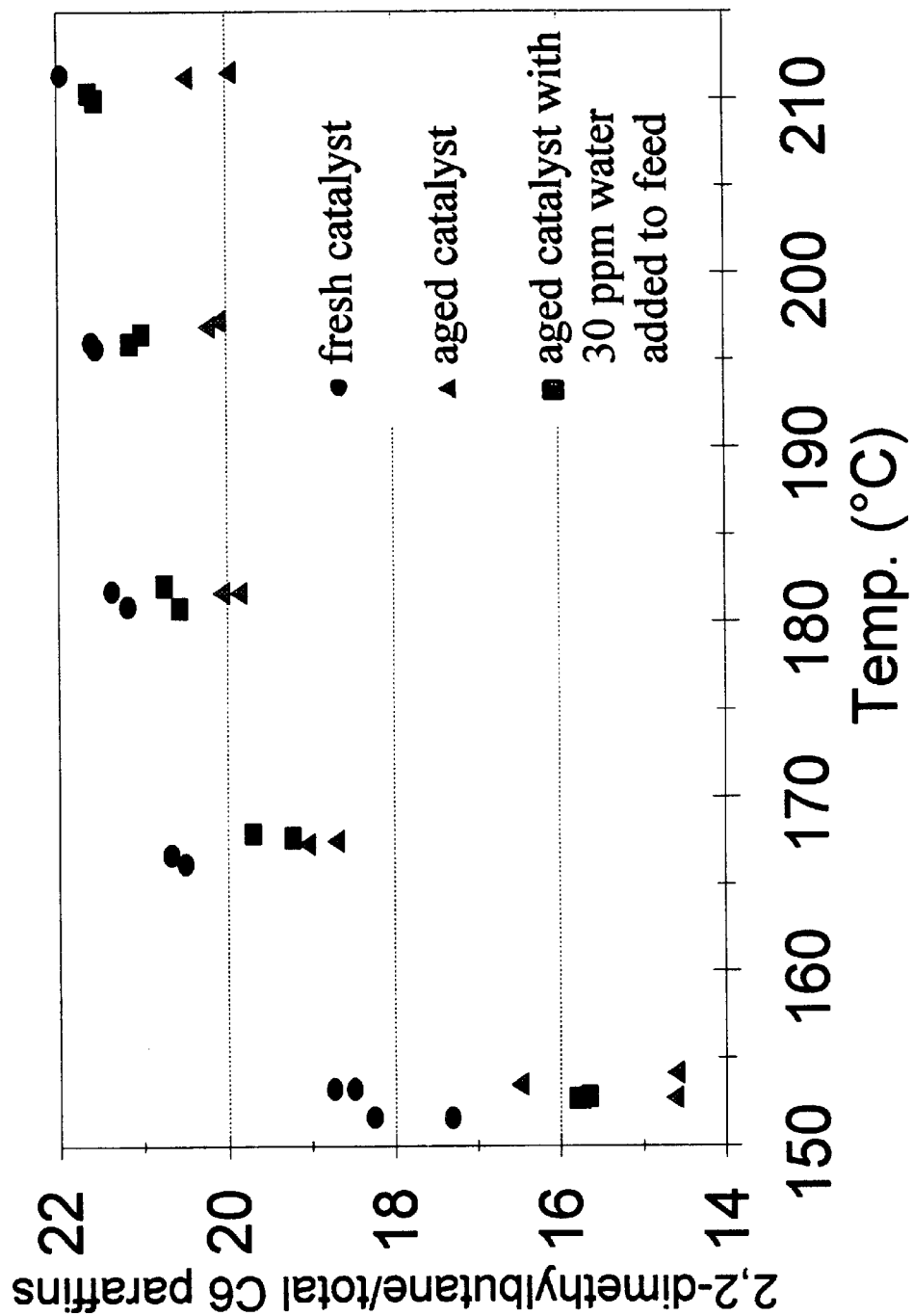

A dry, i.e., less than 1 ppm water, mixture of $C_5$ and $C_6$ linear alkanes was isomerized using sulfated zirconia catalyst having platinum dispersed thereon at a pressure of 250 psig and a hydrogen to hydrocarbon ratio of 2. The temperature was ramped between 160° C. and 215° C. and the conversion of $C_5$ linear alkanes to isopentane and the conversion of $C_6$ linear alkanes to 2,2-dimethylbutane as determined by gas chromatography were tracked. The test was allowed to continue in order to age the catalyst. After approximately 25 days, the same dry mixture of $C_5$ and $C_6$ linear alkanes was again isomerized as described above with the temperature ramp again starting at 160° C. and ending at 215° C. The conversion of $C_5$ linear alkanes to isopentane and the conversion of $C_6$ linear alkanes to 2,2-dimethylbutane as determined by gas chromatography were again tracked and were compared to the data generated on the fresh catalyst. As shown in FIG. 1 and FIG. 2, the aged catalyst data showed less activity and less conversion than the fresh catalyst data. In FIG. 1, the x-axis shows the temperature of the isomerization reaction, and the y-axis shows the degree of isomerization of n-pentane as a ratio of isopentane to the total $C_5$ alkane isomers. In FIG. 2, the x-axis shows the temperature of the isomerization reaction, and the y-axis shows the degree of isomerization of n-hexane as a ratio of 2,2-dimethylbutane to the total $C_6$ alkane isomers.

The isomerization reaction survey was repeated a third time using the now aged catalyst, but with the addition of 30 ppm water to the mixture of $C_5$ and $C_6$ linear alkanes. Again, the isomerization was preformed as described above with the temperature ramp again starting at 160° C. and ending at 215° C. The conversion of $C_5$ linear alkanes to isopentane and the conversion of $C_6$ linear alkanes to 2,2dimethylbutane as determined by gas chromatography were again tracked and were compared to the data generated on the previous two experiments. As shown in FIG. 1 and FIG. 2, the activity of the aged catalyst with the addition of water had almost returned to that of the fresh catalyst at temperatures above 180° C., and was significantly greater than that of the aged catalyst without water in the reaction mixture. The activity of the catalyst was not improved significantly at temperatures below 180° C. This data demonstrates the increased activity in the solid strong acid catalyst provided by this invention.

EXAMPLE 2

A dry, i.e., less than 1 ppm water, feed mixture of $C_5$ and $C_6$ linear alkanes was isomerized using sulfated zirconia catalyst having platinum dispersed thereon at a pressure of 250 psig and a hydrogen to hydrocarbon ratio of 2. The temperature was held isothermally at 204° C. and the conversion of $C_5$ linear alkanes to isopentane and the conversion of $C_6$ linear alkanes to 2,2-dimethylbutane as determined by gas chromatography were tracked. After a period of time, during which the catalyst showed a loss of activity, 10 ppm water was added to the feed mixture. The activity of the catalyst showed an immediate and significant increase. After another period of time, the water was removed from the feed mixture and the catalyst showed continued decrease in activity. Again 10 ppm water was added to the feed mixture and again the activity the catalyst increased. After a period of time, the 10 ppm water was increased to 35 ppm water. Upon the increase of water, the activity of the catalyst sharply decreased, indicating too much water had been added at the process conditions used and the acidity of the catalyst had been attenuated.

Figure 3:
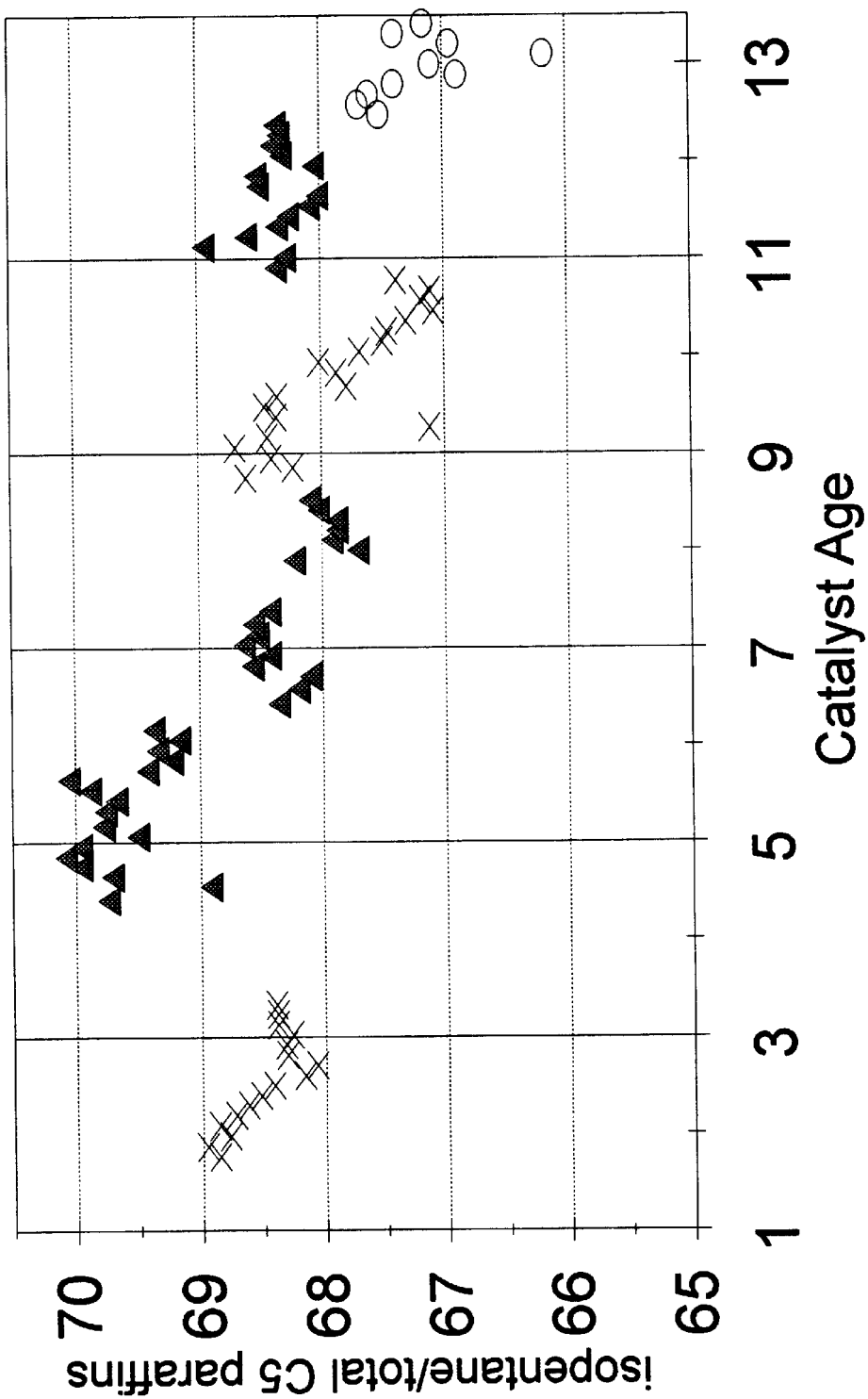
FIG. 3 and FIG. 4 are plots of the isomerization of $C_5$ and $C_6$ hydrocarbons, respectively, under isothermal conditions using 1) dry feed, 2) feed containing 10 ppm water, and 3) feed containing 35 ppm water.
Figure 4:
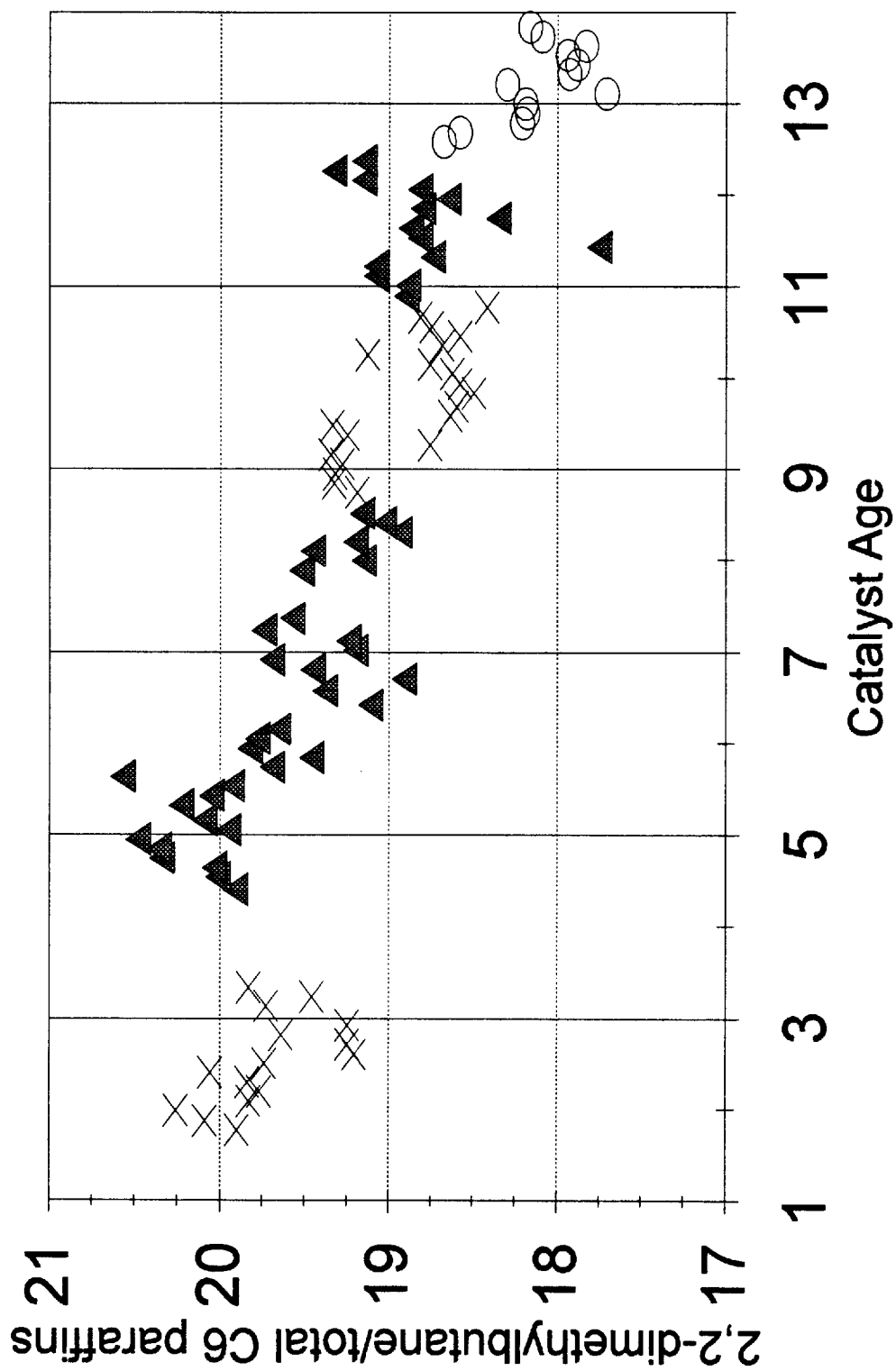

In FIG. 3, the x-axis shows a relative scale of the age of the catalyst, and the y-axis shows the degree of isomerization of n-pentane as a ratio of isopentane to all $C_5$ hydrocarbons. In FIG. 4, the x-axis shows a relative scale of the age of the catalyst, and the y-axis shows the degree of isomerization of n-hexane as a ratio of 2,2-dimethylbutane all $C_6$ hydrocarbons. The data demonstrates the increased activity of the catalyst when water is added to the reaction mixture. The data also demonstrates that too much water added is detrimental to the activity of the catalyst.

What is claimed is:

1. A method of promoting the activity of a solid strong acid catalyst in catalyzing continuous isomerization of a linear alkane containing from about 4 to about 8 carbon atoms to a branched alkane, said catalyst having both Lewis acid sites and Brönsted acid sites and selected from the group consisting of sulfated metal oxides, tungstated metal oxides, and molybdated metal oxides, said method comprising converting Lewis acid sites to Brönsted acid sites in situ by adding water in an amount ranging from about 1 ppm to about 50 ppm or a water precursor in an amount sufficient to generate from about 1 ppm to about 50 ppm water.

2. The method of claim 1 wherein the water added or generated is in amounts from about 5 ppm to about 25 ppm.

3. The method of claim 1 where said metal oxides are selected from the group consisting of hydroxides, oxides, oxyhydroxides and oxide-hydrates of Group IV-A, Group III-A, Group III-B, and Group V-A metals.

4. The method of claim 1 wherein said catalyst has a Group VIII metal supported on the metal oxide.

5. The method of claim 1 where said metal oxides are selected from the group consisting of hydroxides, oxides, oxyhydroxides and oxide-hydrates of Group IV-A, Group III-A, and Group III-B metals and the catalyst further has an oxide, hydroxide, oxyhydroxide or oxide-hydrate of a Group V-A, Group V-B, Group VI-B, or Group VII-B metal.

6. The method of claim 1 where the water precursor is selected from the group consisting of alcohols, ethers, aldehydes, phenols, and ketones.

7. A method of promoting the activity of a solid strong acid employed as a catalyst in a continuous acid catalyzed reaction, said catalyst having Lewis acid sites and Brönsted acid sites, and selected from the group consisting of sulfated metal oxides, tungstated metal oxides, and molybdated metal oxides, said acid catalyzed reaction being selected from the group consisting of catalytic cracking, catalytic reforming, hydrodesulfurization, isomerization, alkylation of aliphatic and aromatic hydrocarbons, polymerization, and oligomerization, and said method comprising converting Lewis acid sites to Brönsted acid sites in situ by adding water in an amount ranging from about 0.1 ppm to about 500 ppm or a water precursor in an amount sufficient to generate from about 0.1 ppm to about 500 ppm water.

8. The method of claim 7 wherein said metal oxides are selected from the group consisting of hydroxides or oxides of Group IV-A, Group III-A, Group III-B, and Group V-A metals.

9. The method of claim 7 wherein said catalyst has a Group VIII metal supported on the metal oxide.

10. The method of claim 7 where said metal oxides are selected from the group consisting of hydroxides, oxides, oxyhydroxides and oxide-hydrates of Group IV-A, Group III-A, and Group III-B metals and the catalyst further has an oxide, hydroxide, oxyhydroxide or oxide-hydrate of a Group V-A, Group V-B, Group VI-B, or Group VII-B metal.

11. The method of claim 7 wherein the strong acid catalyst is present in a fixed bed.

12. The method of claim 7 where the water precursor is selected from the group consisting of alcohols, ethers, aldehydes, phenols and ketones.

13. The method of claim 7 where the water precursor is an alcohol or ether containing from about 1 to about 8 carbon atoms and the reaction is conducted at about 80° C. or greater.

* * * * *